Sept. 15, 1970 A. REINDL 3,529,243

SYNCHRONOUS TACTICAL RADIO COMMUNICATION SYSTEM

Filed Oct. 11, 1967 3 Sheets-Sheet 1

INVENTOR,
ADOLF REINDL.

BY Gordon W. Kerr, Agent
Harry M. Saragovitz,
Edward J. Kelly &
Herbert Berl

ATTORNEYS.

Sept. 15, 1970 A. REINDL 3,529,243

SYNCHRONOUS TACTICAL RADIO COMMUNICATION SYSTEM

Filed Oct. 11, 1967 3 Sheets-Sheet 2

INVENTOR,
ADOLF REINDL.

BY Gordon W. Kerr Agent
Harry M. Saragovitz
Edward J. Kelly &
Herbert Berl
ATTORNEYS.

Sept. 15, 1970 A. REINDL 3,529,243

SYNCHRONOUS TACTICAL RADIO COMMUNICATION SYSTEM

Filed Oct. 11, 1967 3 Sheets-Sheet 3

INVENTOR,
ADOLF REINDL.
BY Gordon W. Kerr, Agent
Harry M. Saragovitz
Edward J. Kelly &
Herbert Berl
ATTORNEYS.

United States Patent Office 3,529,243
Patented Sept. 15, 1970

1 2

3,529,243
SYNCHRONOUS TACTICAL RADIO COMMUNICATION SYSTEM

Adolf Reindl, Asbury Park, N.J., assignor to the United States of America as represented by the Secretary of the Army Filed Oct. 11, 1967, Ser. No. 674,686
Int. Cl. H04b 1/44
U.S. Cl. 325—55 6 Claims

ABSTRACT OF THE DISCLOSURE

This system comprises a master station and a plurality of slave stations, each of which is operated on a different frequency or channel. Each station receives and transmits in alternate time periods on the same frequency. The system is synchronous in that the reception and transmission periods of all slave stations are controlled by the master station. Conversations between slave stations are relayed through the master station. The timing of the transmission and reception periods is such that interference between nearby slave stations operating on nearby frequencies is eliminated.

This invention relates to a tactical military radiotelephone system of the synchronous type. Tactical or battlefield communication systems usually comprise a large number of stations most of which are mobile and which are usually confined to a relatively small area, for example, one hundred square miles. The mobility of the stations and their high density means that two or more stations will often be operating simultaneously at close range. Each station is normally assigned a different frequency or channel, however, if two nearby stations are assigned to frequencies which are fairly close together and the receiver of the first station is open while the transmitter of the second station is operating, the strong signal received at the first station from the nearby transmitter of the second station will swamp the first station even though it is tuned to a different frequency. One way of correcting this interference is to space the channels far enough apart so that nearby transmissions can be discriminated against by filtering techniques, however this expedient is wasteful of bandwidth. The present invention comprises a communication system composed of a master station and a plurality of slave stations, each of which is assigned a different frequency or channel. Each slave station may communicate with any other slave or with master station. All signals from the slave stations are first transmitted to the master station, are there demodulated and remodulated onto the channel of the called slave station and relayed to the called slave station. Each station receives and transmits in alternate time periods on the same frequency. The system is synchronous in that the reception and transmission periods of all slave stations are controlled by the master station. Communication is carried on in repetitive cycles or frames. At the beginning of each frame the master station emits a burst of pulse modulated signals to each called slave station on the slave's carrier frequency or channel. Following this burst, the receiving circutry of the master station is switched on to await replies from the individual slave stations on their channels. Following the reception at each slave station of its signal, the receiver thereof is blocked by means of a transmit-receive switch, and the slave then emits a reply burst of pulse modulated signals. The master station receiving circuitry is adapted to simultaneously receive these reply bursts from all operating slaves, since the master station is equipped to receive replies on all channels simultaneously. The frame length is chosen so that the reply from the most distant slave station will arrive at the master station before the start of the following frame. The receivers of all slave stations remain blocked from the end of the burst reception to the beginning of the following frame. With this arrangement, none of the slave receivers can pick up any other slave's transmissions, regardless of the location thereof, and interference of the type discussed above is eliminated. Since the master station is required to pick up a plurality of closely spaced channels simultaneously, means are provided at each slave station to automatically or manually adjust the slave transmitted power level so that all slave station replies arrive at the master station at approximately the same level, regardless of the range of any given slave station. With this arrangement the channels can be closely packed with no interference or crosstalk.

It is thus an object of the invention to provide an improved tactical military communication system of the synchronous type.

Another object is to provide a radio communication system in which a plurality of stations may simultaneously operate in closed proximity to each other on nearby frequencies without interference.

These and other objects and advantages of the invention will become apparent from the following detailed description and drawing, in which.

Figure 1:
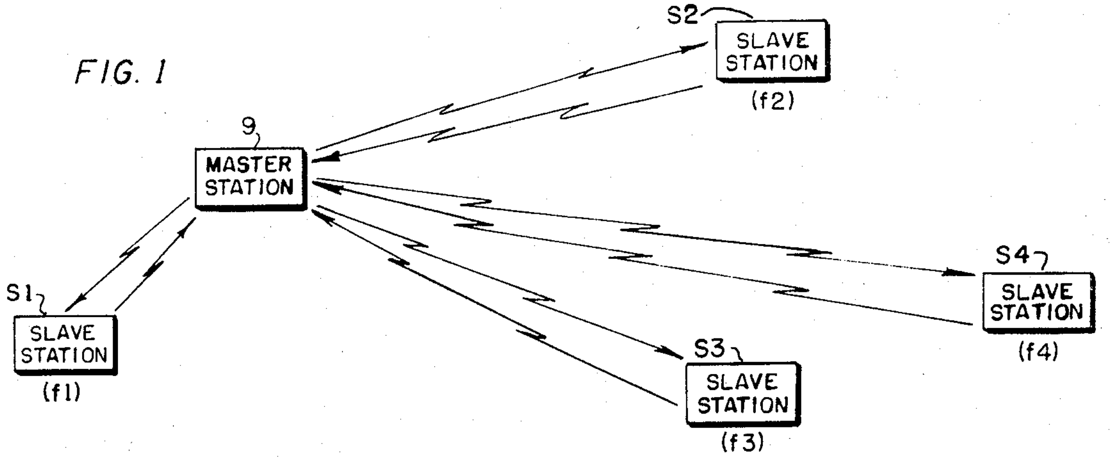
FIG. 1 shows a block diagram of an illustrative radiotelephone system.

The system of FIG. 1 comprises a master station 9 with four similar slave stations S1, S2, S3, and S4 distributed at random locations in the vicinity thereof. S1 is closest to the master station. S2 and S3 are at the same range from the master, and S4 represents a station at the maximum range of the system. In practice the system would generally comprise many more slave stations, however the principle of operation is the same regardless of the number of stations involved.

Figure 2:
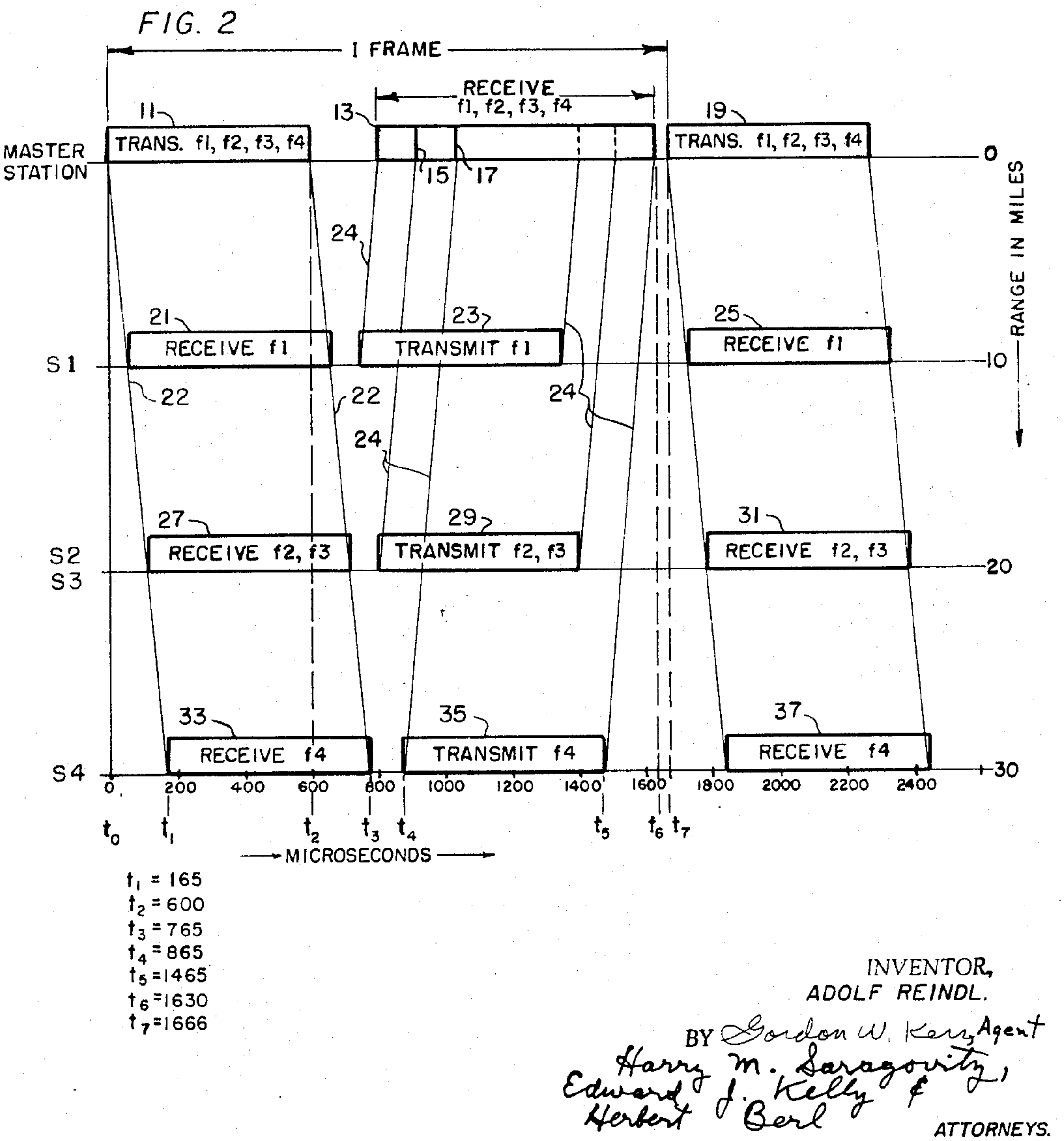
FIG. 2 is a graph illustrating the reception and transmission periods of the stations of FIG. 1 for one full frame and part of a second frame.

FIG. 2 illustrates the transmission and reception periods of each of the stations of FIG. 1 in the illustraitve case in which slave station S1 is at approximately one-third the maximum range of the system, stations S2 and S3 are both at approximately two-thirds maximum range and S4 at the maximum range which is arbitrarily chosen as 30 miles. The hornzontal lines labelled "Master," "S1" etc. show the transmission and reception periods at the various stations, plotted against time. It will be assumed that the frame length is 1666 microseconds. This is a frame repetition rate of 600 per second. Each frame comprises a 600 microsecond transmission period and an equal reception period. Thus transmission and reception require 1200 microseconds. The remainder of the frame length comprises a combination of the round trip transit time to the most distant station, a 100 microsecond delay between the end of the reception period at each slave station and the beginning of the transmission period thereat, a 42 microsecond delay between the end of the reception period at the master station and the beginning of the next succeeding frame. In the present example, the round trip transit time of the maximum range of 30 miles is approximately 324 microseconds, since radio waves travel approximately 5.4 miles in a microsecond. Since, in order to reduce interference, a reply must be received from the slave station at maximum range before the next frame begins, the maximum range determines the minimum frame length. In order to transmit voice signals with frequency components up to 4000 c.p.s., a minimum of 8000 pulse amplitude modulated voice samples must be transmitted in one second or one sample per 125 microseconds. Since the minimum frame length is 324 microseconds for a 30 mile range, it is obvious that a plurality of voice signal samples must be transmitted during each frame. For this reason, during each transmission period a plurality of time-compressed voice signal pulses are emitted by each transmitter in the system. These pulses can be easily restored to their proper timing by means of buffers at each station. For example, during each transmission period of 600 microseconds, 64 pulse code modulated bits or 64 pulse amplitude modulated bits may be transmitted.

Referring again to FIG. 2, the beginning of the frame at the master station occurs at $t_0$ or zero microseconds. The numeral 11 represents the 600 microsecond transmission period of the master station during which a plurality of time-compressed voice pulses or samples are transmitted to each operating slave station on their respective carrier frequencies of $f_1$, $f_2$, $f_3$, and $f_4$. The master station transmits with equal power on all channels. The master transmitted signals will reach each of the slaves at a time dependent on the range of the particular slave. Since the ordinate of FIG. 2 represents range or mileage from the master, diagonal lines 22 having a slope proportional to the speed of radio waves can be drawn to indicate when tthe master transmitted signals reach any given range and similar oppositely-sloped diagonals 24 can be drawn to show when the slave transmissions reach the master station. Thus the frames at each slave station will have different timing or phases depending on the distance from the master station. Thus the reception period 21 of the station S1 at a range of 10 miles begins at approximately 54 microseconds after the start of transmission period 11 of the master, this being the one-way transit time between these two stations. The master station transmission will arrive at the stations S2 and S3 simultaneously during reception period 27, as seen in FIG. 2 and at station S4 during reception period 33, which begins at 162 microseconds, or $t_1$. Each slave station receives all of the master's transmissions simultaneously, however since all of the channels are received at equal strength, it is a simple matter to tune out all but the particular slave's channel by conventional filtering techniques, even though the channels are closely packed on the frequency scale. Following the end of each reception period at each slave station, after a delay which is 100 microseconds in the illustration, the slave station transmission period of 600 microseconds begins. During these periods voice samples which have been accumulated during the preceding frame of the slave are transmitted back to the master station. The delay period is required to switch the slave stations from the receive to the transmit mode. The transmission period of station S1 is indicated by numeral 23, those of stations S2 and S3 by numeral 29 and that of S4 by numeral 35. The diagonal lines 24 show the arrival times of the various reply transmissions from the slave stations at the master station, which includes a receiver adapted to pick up and demodulate all of the frequencies $f_1$, $f_2$, $f_3$, and $f_4$. Following the end of the transmission period 11 at the master station, the receiver thereof is enabled until the start of the following transmission period 19. The reply transmissions from the slaves will arrive at different but overlapping times, as indicated by the numerals 13, 15, and 17, which mark the start of reception from the different slave stations. The end of the master reception period occurs at $t_6$ or 1624 microseconds which marks the end of the reply burst from the most distant station. Following this a 42 microsecond delay period is provided to enable the master station to switch to the transmit mode. At $t_7$ or 1666 microseconds another identical frame begins. All of the slave receivers are disabled for a fixed period beginning at the end of their respective reception periods and including the 100 microsecond delay period, the 600 microsecond reply transmission period, plus the one-way transit time from the maximum range of the system. This arrangement insures that all slave receivers are disabled while all other slave stations are transmitting. It can be seen that the relative strengths of the slave reply transmissions at the master will vary inversely with the range of the different slaves, if all slaves transmit at the same power level. This will cause interference between nearby channels at the master receivers. In order to avoid such interference, the system may be provided with a plurality of servo loops for automatically adjusting the transmitted power levels of the different slave stations so that the received signal strengths at the master are approximately equal regardless of the slave station range. This adjustment may be a manual one, in which case the master station operator would advise each slave station operator to adjust his power level to the proper value.

Figure 3:
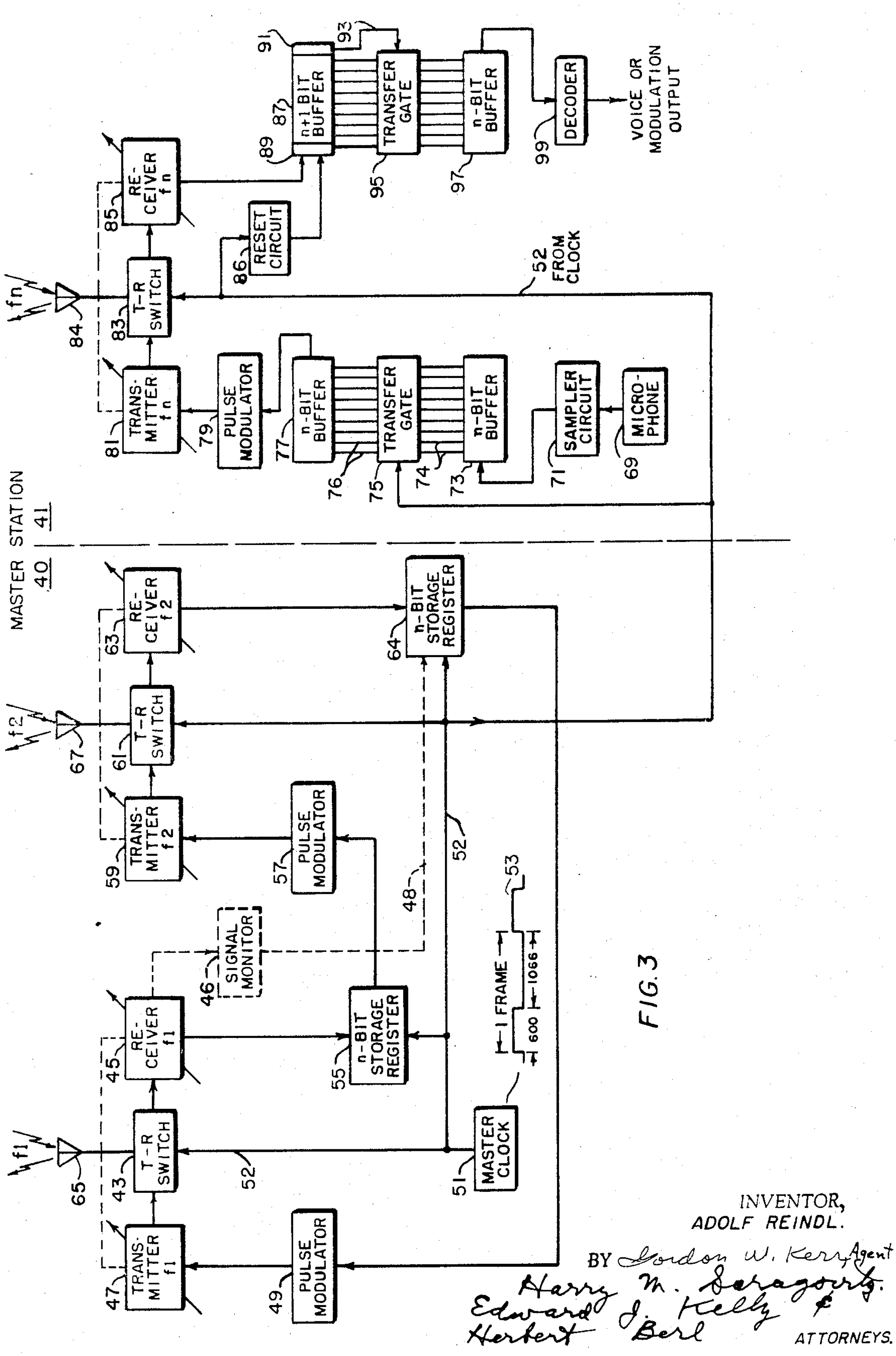
FIGS. 3 and 4 show illustrative circuitry of a master station and a slave station, respectively.
Figure 4:
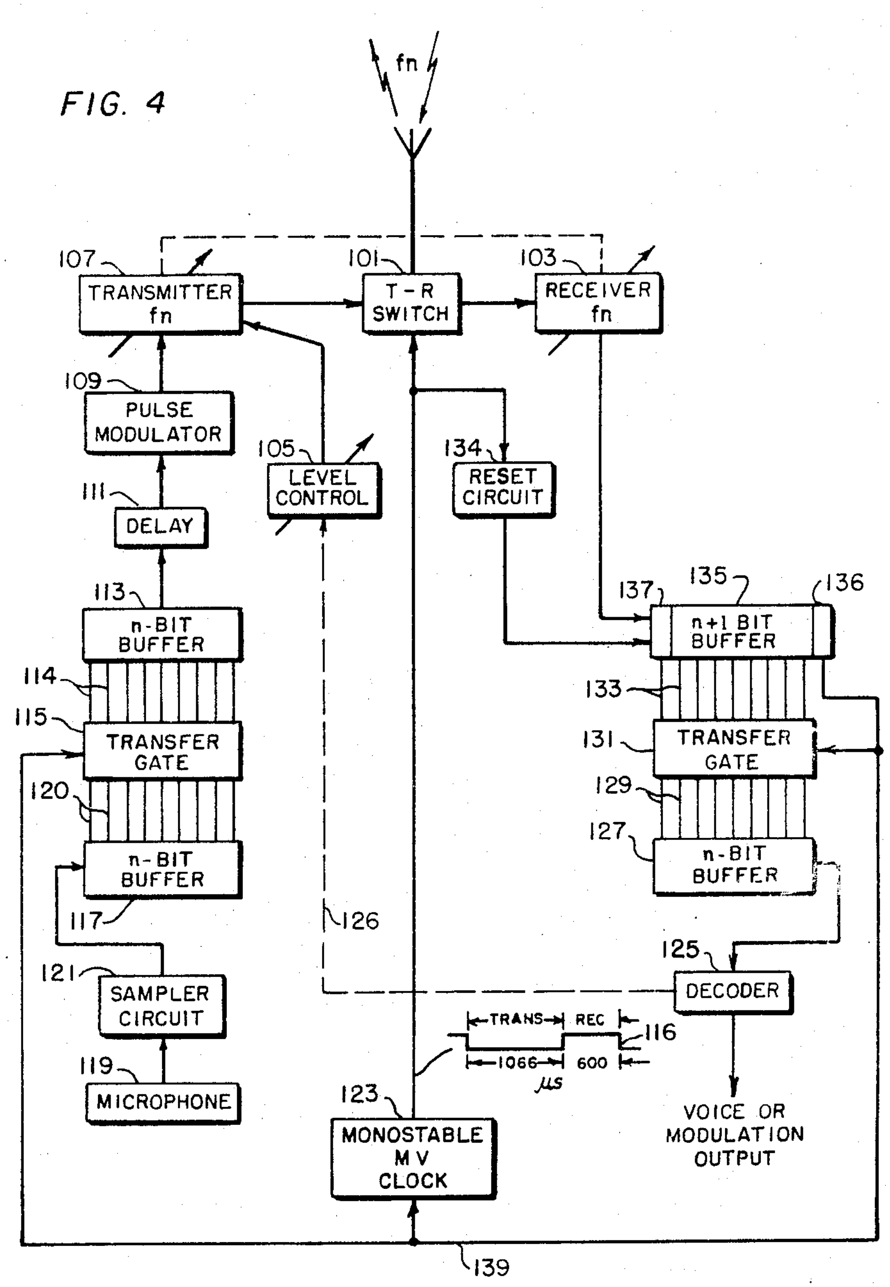

FIG. 3 is a simplified block diagram of an illustrative master station which may be used in the practice of the present invention and FIG. 4 is a diagram of a typical slave station of the system.

The master station of FIG. 3 comprises a supervisory transceiver 41 which is used for communication between the master station and any of the slave stations. This supervisory transceiver is usually used in making the required connection between pairs of the slave stations which desire to communicate with each other. The pair of interconnected transceivers indicated at 40 in FIG. 3 is the means for relaying signals back and forth between a pair of communicating slave stations. Thus one interconnected pair of transceivers 40 is required for each simultaneous conversation which is taking place in the system. If it is desired that all four of the slave stations of FIG. 1 be simultaneously operated, the master station would require two of the interconnected pairs of transceivers 40, thus permitting two two-way conversations between both pairs of the slave stations. Where there are larger numbers of slave stations, the master station relaying equipment 40 may be time shared, as is the practice with commercial central office telephone equipment. For example, if there are 100 slave stations, 50 pairs of transceivers 40 would be required if all slave stations are to be operated simultaneously. However, if only half of the slave stations are on the air at any one time, only 25 of the pairs of transcievers 40 would be required to service such a system. This results in economy of master station equipment.

The supervisory transceiver 41 comprises a common antenna 83 which is alternately switched to transmitter 81 and received 85 by transmit-receive switch 83. The transmitter 81 and receiver 85 are tunable in unison to any of the channels of the system, as indicated by the dashed line connection therebetween. The voice signals to be transmitted originate at microphone 69. The sampler circuit 71 periodically samples the amplitude of the microphone output and converts the amplitude samples to a binary number proportional thereto by conventional pulse code modulation techniques. The train of output pulses from sample circuit 71 is then fed into an $n$ bit buffer 73, which may comprise a shift register of $n$ stages, where $n$ is the number of pulses which is emitted by each transmitter of the system during each transmission period. The buffer 73 is filled at a real-time rate, that is 8000 voice samples per second are coded if the highest voice frequency to be transmitted is 4000 c.p.s. The transmission and reception periods of the supervisory transceiver 41 are controlled by the master station clock 51 via lead 52. This clock also controls the transfer gate 75 which is used to transfer the coded voice signals from buffer 73 to buffer 77. When the transfer gate 75 receives a positive voltage from the clock 51, which is indicative of the master station's transmit period, the gate 75 is closed to transfer the coded voice signals in buffer 73 to the corresponding stages of buffer 77 via lines 74 and 76. An internal clock in buffer 77 then shifts the coded voice signals therein serially out to the pulse modulator 79. The clock of buffer 77 operates at a higher rate than that of sampler circuit 71, thus the voice signals are time-compressed so that voice signals accumulated on a real-time basis over an entire frame may be transmitted in the portion of the frame which is allotted to transmission. The pulse modulator 79 modulates the transmitter 81 in conventional fashion. The zero or negative portion of the output of clock 51, shown in the diagram 53 is arranged to switch the antenna 84 to the receiver 85, which is tuned to receive reply transmissions from slave stations with which the transceiver 41 is communicating. The output of receiver 85 is a series of 600 microsecond bursts of time-compressed coded voice signals. The circuitry following the receiver comprises a means to decompress these signals and restore them to a real-time basis, so that it will be intelligible as a voice signal. This circuitry comprises an $n+1$ bit buffer 87, a transfer gate 95, an $n$ bit buffer 97, a decoder 99 and a reset circuit 86. Following each transmission period the reset circuit 86, being triggered by clock 51, resets the first stage 89 of buffer 87 to binary "one" and the remainder of the stages to binary zero. The received coded voice signals are then fed serially into the buffer 87 during the reception period of transceiver 41 and the "one" originally in stage 89 progresses to the right and finally reaches the last stage 91. When this occurs the register contains the entire burst of coded voice signals received from the slave station, in addition to the "one" bit in stage 91. The arrival of the "one" bit in stage 91 is an indication that the buffer 87 is full and when this occurs the resulting voltage on lead 93 closes transfer gate 95 and transfers the $n$ bits of buffer 87 to $n$ bit buffer 97. The contents of buffer 97 are then serially shifted out at the lower real-time rate to decoder 99, which converts the binary coded signals back to a voice waveform.

The pair of interconnected transceivers 40 comprise a first transceiver composed of transmit-receive switch 43, receiver 45, transmitter 47, and antenna 65 and a second transceiver composed of transmit-receive switch 61, receiver 63, transmitter 59 and antenna 67. The first transceiver is shown tuned to frequency $f_1$, and the second transceiver to $f_2$, which would be the case if the equipment were relaying a conversation between slave stations S1 and S2. The master clock 51 controls both transmit-receive switches, so that both transmitters 47 and 59 have simultaneous 600 microsecond transmission periods and also simultaneous reception periods. The clock waveform is shown at 53. During each transmission period, each transmitter transmits the time-compressed coded voice signals received by the other transceiver during the previous frame. These coded signals are temporarily stored in the storage registers 55 and 64 between reception and retransmission on the frequency or channel of the called slave station. For example, during the reception period, transmissions from slave station S1 are picked up and demodulated by receiver 45 and applied to storage register 55 and during the same reception period transmissions from slave station S2 are picked up and demodulated by receiver 63 and applied to storage register 64. At the end of the reception period both storage registers will be full, since there are $n$ bits in the received signals. The beginning of the next frame is marked by a rise in the voltage at the output of clock 51, as can be seen from waveform 53. This voltage rise on lead 52 initiates the shifting of the contents of the register 55 to the pulse modulator 57, which controls the transceiver 59 and simultaneously the contents of register 64 are shifted out and retransmitted to station S1 via transmitter 47. It should be noted that the coded voice signals are relayed or retransmitted without any change in their time-compressed form.

The typical slave station of FIG. 4 is generally similar to the supervisory transceiver 41 of FIG. 3, but the clock 123 thereof is synchronized by the incoming signal from the master station. The circuitry includes the transmit-receive switch 101 and the gang-tuned receiver 103 and transmitter 107. The coded pulse train output of receiver 103 is applied to the serial input of $n+1$ bit buffer 135. The pulse train is transferred through gate 131 to $n$ bit buffer 127 at the end of each received burst of coded pulses. The output of buffer 127 is serially applied to decoder 125 at a real-time rate. The decoder 125 converts the continuous pulse train output of buffer 127 to a voice signal. As in the transceiver 41 of FIG. 3, a binary "one" is inserted into the first stage 137 of buffer 135 by reset circuit 135, which is triggered by clock 123. When this "one" reaches the last buffer stage 137, a pulse appears on lead 139 which indicates the end of the reception period. This pulse is applied to the clock 123 as a triggering or synchronizing pulse. The clock 123 is in the form of a monostable multivibrator, the output of which is stable in the positive polarity. A positive output from 123 will switch the transmit-receive switch to the receive mode. At the end of the reception period the pulse on lead 139 will switch the multivibrator 123 to its astable or low voltage position for a period of approximately equal to the frame length minus the reception period, which is 1066 microseconds in the illustrative case. The low voltage output from the clock switches the transceiver from the receive to the transmit mode. The outgoing voice signal from microphone 119 is sampled and coded in sampler circuit 121, applied serially at a continuous real-time rate to buffer 117 and transferred via gate 115 to buffer 113 at the end of each reception period under the control of the synchronizing pulse on lead 139. The contents of buffer 113 are shifted through delay circuit 111 at the higher transmission rate to achieve the time-compression of the coded voice signals. The delay circuit 111 provides the 100 microsecond delay between the reception and transmission periods. The pulse modulator 109 controls the transmitter 107 in conventional fashion. The level control 105 is manually adjustable by the slave station operator to vary the transmitter power level to the proper value. The operator may be advised of the required setting of this control by the master station operator, so that all slave station signals at the master have approximately the same level, as is discussed above. A means for automatically controlling the slave transmitter power level is shown in dashed outline in FIGS. 3 and 4. At the master station of FIG. 3, the signal monitor circuit 46 continuously measures the level of the signal received from slave station S1 and produces a level control signal on lead 48. This signal may be a single bit, for example, a binary one to indicate that the slave station level is too high in amplitude or a binary zero to indicate the opposite condition. This level control bit is fed to one stage of register 64 via lead 48 and forms part of the signal transmitted back to slave station S1. At the slave station of FIG. 4, the decoder 125 would include circuitry for applying the level control bit to level control circuit 105 via lead 126, for automatic operation thereof. The receiver 63 would also include a signal monitor (not shown), the output of which would be inserted into register 55 for controlling the level of slave station S2.

It should be noted that this system provides full duplex operation, that is, both parties having a conversation can talk simultaneously and each will hear the other's signal. Even though the transmitter and receiver of each station are alternately operative, the time-compression of the signals before transmission and the time-decompression after the reception thereof at the called station results in the full duplex capability.

If two or more of the systems described herein are within range of each other, communication can be carried on between slave stations of different systems via the master stations. In this event the slave station's signals would be relayed through two or more master stations before reaching the called slave station. In this event, it would be necessary to synchronize the clocks of all communicating master stations by some means such as atomic clocks or frequency averaging.

The invention should not be limited by the illustrative embodiment described. It is obvious that other frame lengths, transmission, reception and delay periods can be utilized without departing from the inventive concepts disclosed herein. Accordingly, the invention should be limited only by the scope of the appended claims.

The invention described herein may be manufactured, used, and licensed by or for the government for governmental purposes without the payment to me of any royalty thereon.

What is claimed is:

1. A radiotelephone system comprising a master station and a plurality of slave stations, said system being adapted to provide full duplex communication between any pair of said stations, each said station comprising a transmitter, receiver and a transmit-receive switch for alternately connecting said transmitter and said receiver to an antenna, said transmitter and receiver being gang-tunable in unison to any of a number of closely-spaced frequencies, communicating stations of said system being tuned to different frequencies, signals exchanged between slave stations of said system being relayed through said master station, communication being carried on it repetitive cycles or frames, the master station comprising a master clock connected to said transmit-receive switch for controlling the operation thereof, the period of said master clock determining the length of each frame, means at said master station to emit a burst of time-compressed and coded voice signals to each operating slave station on their respective frequencies during one portion of each frame, means at each slave station to emit a reply burst of time-compressed and coded voice signals following the reception of the master stations burst, and means at said master station to receive said slave station reply bursts during another portion of each frame, the frame length being chosen so that the said reply burst from the slave station at the maximum range of the system is received at the master before the beginning of the next frame.

2. The system of claim 1 in which each slave station includes a clock synchronized by the received bursts of voice signals from said master station.

3. The system of claim 1 wherein the transmitter of each slave station includes a means for adjusting the level of the transmitted signals.

4. The system of claim 1 wherein each station comprises means to code and time-compress its voice signals prior to transmission and also means to time-decompress and decode said received bursts of signals, whereby intermittently received signals are converted to a continuous voice signal.

5. The system of claim 1 wherein each burst of coded and time-compressed voice signals comprises a plurality of coded voice signal samples.

6. A duplex radiotelephone system comprising a master station and a plurality of slave stations, each slave station operating at a different frequency, said master station comprising means to relay voice signals between pairs of communicating slave stations, communication taking place in repetitive cycles or frames, said master station emitting a burst of time-compressed voice signals to each operating slave station during a portion of each frame, means at each slave station to emit a reply burst of time-compressed voice signals following the reception of each of said bursts emitted by the master station, means at the master station for receiving said reply bursts during another portion of each frame, said frame being of such length that the reply burst from the slave station at the maximum range of the system arrives at the master station before the next burst is emitted by the master station.

References Cited

UNITED STATES PATENTS

| | | | |
|---|---|---|---|
| 2,176,868 | 10/1939 | Boswau | 250—6 |
| 2,521,721 | 9/1950 | Hoffman | 250—9 |
| 3,358,233 | 12/1967 | Reinol | 325—55 |

RICHARD MURRAY, Primary Examiner

K. W. WEINSTEIN, Assistant Examiner

U.S. Cl. X.R.

325—58; 343—178, 179, 204